United States Patent

[11] 3,540,651

| [72] | Inventor | Gordon J. Fairbanks<br>Indianapolis, Indiana |
|---|---|---|
| [21] | Appl. No. | 765,053 |
| [22] | Filed | Oct. 4, 1968 |
| [45] | Patented | Nov. 17, 1970 |
| [73] | Assignee | Stewart-Warner Corporation<br>Chicago, Illinois<br>a corporation of Virginia |

[54] COMBUSTION HEATER VEHICLE HEATING SYSTEM
6 Claims, 3 Drawing Figs.

| [52] | U.S. Cl. | 237/8, 237/12.3 |
|---|---|---|
| [51] | Int. Cl. | F24d 3/02 |
| [50] | Field of Search | 237/8A, 12.3I |

[56] References Cited
UNITED STATES PATENTS

| 2,038,193 | 4/1936 | Parsons | 237/8A |
|---|---|---|---|
| 3,008,694 | 11/1961 | Todd | 237/8AUX |
| 3,122,319 | 2/1964 | Friedl | 237/8 |

FOREIGN PATENTS

| 767,631 | 5/1934 | France | 237/8A |
|---|---|---|---|
| 110,466 | 4/1944 | Sweden | 237/12.31 |

*Primary Examiner*—Edward J. Michael
*Attorneys*—Augustus G. Douvas, William J. Newman and Norton Lesser

ABSTRACT: The following specification describes a quick heating system for a vehicle in which a portion of the coolant is bypassed from the engine and continuously recirculated through a combustion heater and the conventional vehicle cabin heater until a desired temperature is reached.

Patented Nov. 17, 1970

3,540,651

INVENTOR

GORDON J. FAIRBANKS

By *Norton Lesser*
Attorney

COMBUSTION HEATER VEHICLE HEATING SYSTEM

FIELD OF THE INVENTION

This invention relates in general to vehicle heating systems and more particularly to a vehicle heating system employing a combustion heater for quickly heating a vehicle cab.

DESCRIPTION OF THE PRIOR ART

In most vehicle heating systems the engine coolant is transmitted through a cabin heater for heating the vehicle cab. On starting the engine, the coolant, however, is at ambient temperature, and since there is a considerable time lag before the engine becomes warm, heat to the cabin is correspondingly delayed. An auxiliary or combustion heater as described in U.S. Pat. Nos. 2,998,806; 2,576,757; 2,533,486; or 2,531,459 may be employed to heat the coolant and supplement the heat supplied by the engine, but this requires the heating of a large coolant mass while transmission of the coolant through or from the engine serves to withdraw heat therefrom.

SUMMARY OF THE INVENTION

The present invention proposes to enable quick heating of the vehicle cab by short circuiting or bypassing coolant from the engine until a desired temperature is reached. Since only a small mass of coolant is heated, the temperature may be brought up quickly, while the retention of coolant in the engine block permits that coolant to also heat more quickly.

In one system the engine pump drives coolant through a conduit bypassing the engine block to the combustion heater and vehicle cab heater, while flow from the engine block is cut off by a thermostatically controlled valve. When a desired temperature is reached as determined by the thermostat setting, the thermostat valve is operated to permit the coolant from the engine pump to circulate through the vehicle heater, while flow through the bypass conduit is cut off.

In another system a gear pump driven by the combustion heater blower is used to drive the coolant through the combustion heater and vehicle cab heater in series. The pressure supplied by the gear pump exceeds the pressure developed by the engine pump so that the coolant from the engine block is prevented from entering the combustion heater until the desired temperature is reached and the combustion heater and gear pump are turned off.

One object of the present invention therefore is to provide an improved system for quickly heating a vehicle cab.

Other objects and features of the present invention will become apparent on examination of the following specification and claims together with the drawings.

DESCRIPTION OF THE PREFERRED EMBODIMENTS

Figure 1:
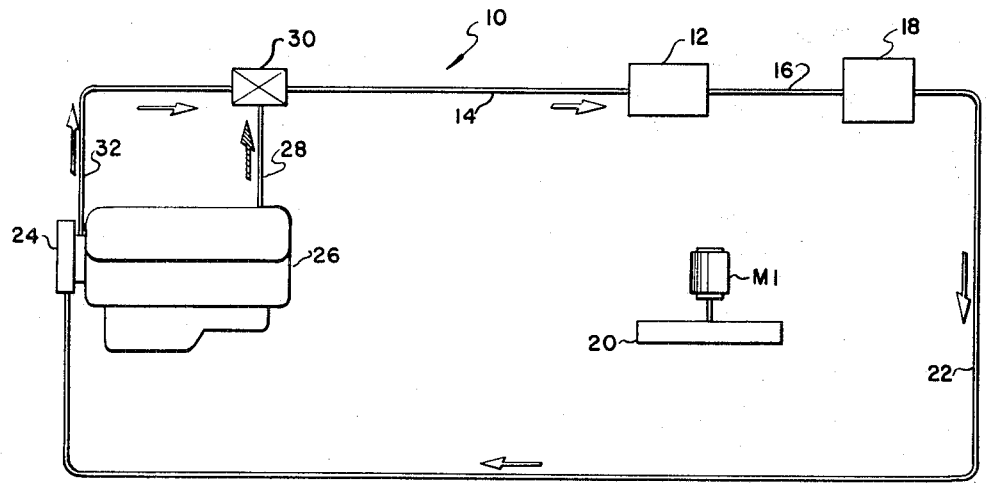
FIG. 1 illustrates one coolant flow system utilizing the principles of the present invention.

In FIG. 1, a system for quickly heating a vehicle cab is illustrated by the reference character 10. The system includes a combustion heater 12 of, for example, the type described in one of the aforementioned patents. Coolant from a conduit 14 flows through a heat exchanger, not shown, in the combustion heater through a conduit 16 to the vehicle cab heater 18. The combustion heater 12 includes a blower 20 having a motor M1, which drives combustion air through a combustion chamber, not shown, in which fuel is ignited for heating the coolant. The vehicle heater 18 generally simply comprises a blower for driving air past the heated coolant for warming the cab. Coolant from the vehicle heater is conducted by means of a conduit 22 to the engine pump indicated schematically at 24.

The engine pump 24 directs the coolant flow either through the engine block indicated schematically at 26 and through a conduit 28 to a thermal control valve 30, or through conduit 32 to the valve 30. Conduit 32 taps the output of the engine pump 24 between the pump and the block 26 to bypass the block. Valve 30 permits coolant flow either from the bypass conduit 32 to conduit 14 or from engine block 26 and conduit 28 to the conduit 14 and then through heaters 12 and 18. The engine radiator containing the coolant to be cooled for engine use is omitted from the drawings since the coolant in the radiator is generally under thermostatic control and is not admitted to the block until a predetermined engine coolant temperature is reached. The coolant in the radiator therefore plays no part in the present invention.

Figure 2:
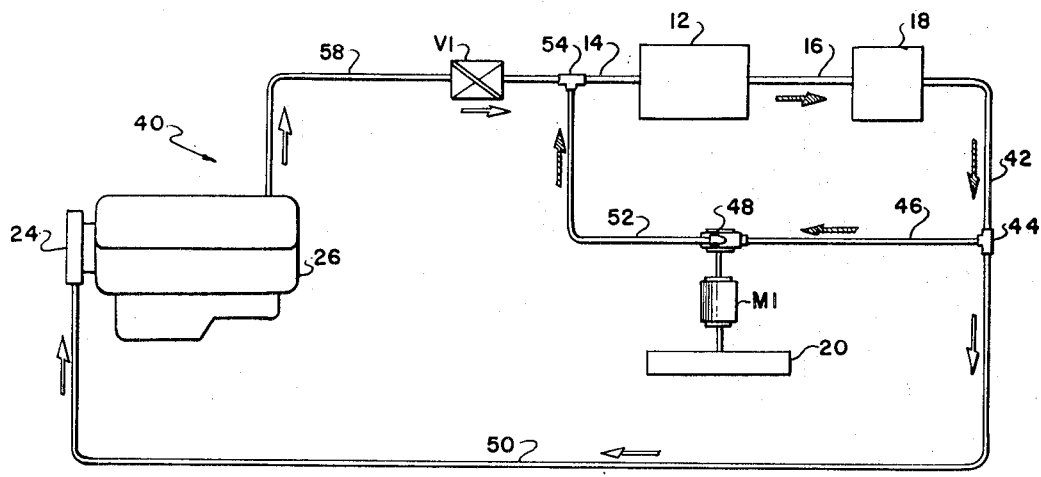
FIG. 2 illustrates another coolant flow system utilizing the principles of the present invention.

In FIG. 2 a second vehicle heating control system is illustrated by the reference character 40. In the system 40 parts identical to those in system 10 are identified by identical reference characters. Thus, the system 40 includes a combustion heater 12 having a blower 20 and conventional heater 18 interconnected with the combustion heater by a conduit 16.

The coolant from heater 18 is directed over a conduit 42 through a tee connection 44 through either a conduit 46 extending to a gear or other positive displacement pump 48 or a conduit 50 connected to the inlet of the engine pump 24. The gear pump 48 is a positive displacement pump driven by the motor M1 of blower 20 and it delivers its output through a conduit 52, a tee connection 54 and a conduit 14 back to the combustion heater 12. Coolant for the heaters 12 and 18 is therefore supplied either from pump 48 or from the engine pump 24 through the engine block 26 and a conduit 58 connected to the tee 54 through a check valve V1. The check valve V1 prevents coolant in conduit 52 from passing through conduit 58 to the engine block since the pump 48 develops a higher pressure than the engine pump 24 to prevent the output of pump 24 from passing to the combustion heater 12.

Figure 3:
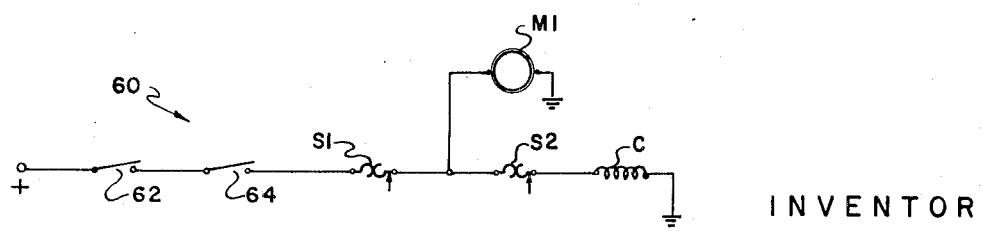
FIG. 3 illustrates an electrical circuit for controlling coolant flow in the systems illustrated in FIGS. 1 and 2.

Both systems 10 and 40 are controlled by a circuit 60 as illustrated in FIG. 3. In the circuit 60 the vehicle battery is connected through conventional ignition switch 62 and the vehicle heater switch 64 when the operator of the vehicle operates switch 64 to secure heat, through a bimetal thermostat switch S1 to the motor M1 of blower 20. Power is also connected from thermostat switch S1 through a second bimetal switch S2 to the coil C of the solenoid valve which opens the fuel line to the combustion heater 12 and initiates operation of heater 12.

With the motor M1 and coil C energized, the heater 12 operates to heat the coolant for delivery to heater 18 and heating the engine cab. With the coolant temperature below a predetermined value, for example 160°F., the thermal valve 30 in system 10 prevents the flow of coolant from conduit 28 and the engine block. Instead coolant is delivered to the heaters 12 and 18 from the engine pump 24 through conduit 32 and bypasses the block 26. Since both heating the coolant in the engine block and the passage of coolant heated by the heater 12 through the block is avoided, the small mass of coolant circulating through the heaters and conduits 22 quickly reaches the optimum temperature and heat is quickly supplied to the vehicle cab.

Switch S1 is usually set to operate when the coolant in conduit 14 reaches 160°F. Switch S1 controls all the electrical circuits for heater 12 and thus turns off the complete heater when its control temperature is reached. Switch S2 is usually set to operate when the coolant in conduit 16 reaches 180°F. Switch S2 controls the electrical circuit to the solenoid valve coil C and thus cycles the burner of heater 12 on and off to maintain an exit temperature of the coolant from heater 12 at approximately 180°F. The valve 30 is usually set to operate when, for example, the block 26 reaches 160°F. and it opens conduit 28 and closes conduit 32 so that the coolant from the block is now circulated through the heater 18 for maintaining the vehicle cab warm. It will be understood that the thermostat valve 30 may be either a conventional bimetal valve or it may be a solenoid valve operated in respective directions on closing and opening of switch S1 to control coolant flow from the block. In a similar manner, check valve V1 could be replaced by a solenoid valve operated by switch S1. The described temperatures and selection of which portion of the coolant to be sensed, are, of course, subject to wide variation.

Likewise, with the circuit 60 shown in FIG. 3, operation of the ignition switch 62 and the heater switch 64 energizes the motor M1 of the combustion heater blower 20 through the thermostat switch S1 and energizes the coil C of the fuel supply solenoid valve through switch S2.

The gear pump 48 is connected to the shaft of blower motor M1 and is therefore operated with the motor M1. Pump 48 receives the coolant from heaters 12 and 18 from conduits 42 and 46 and transmits the coolant through conduits 52 and 14 back through heaters 12 and 18 so that the coolant recirculates in a small loop, bypassing the engine block 26 and is quickly heated to supply heat to the vehicle cabin. The pressure developed by pump 48 exceeds the pressure developed by the engine pump 24 so that the output of pump 24 is blocked from conduit 14 and flow prevented through conduit 50. The check valve V1 prevents the output of positive displacement pump 48 from flowing into conduit 58 and the engine block 26.

When the desired temperature is reached, switch S1 opens to terminate operation of the combustion heater 12. The gear pump 48 therefore terminates operation and blocks flow from conduit 46 to conduit 52. Heated coolant is now conventionally supplied from the engine block 26 through the conduit 58, check valve V1 and conduits 14 and 16 to the vehicle heater 18. If check valve V1 is replaced by a solenoid valve operated by switch S1, the solenoid valve permits flow from the engine block in response to the operation of switch S1.

The foregoing description relates to improved quick heating systems for a vehicle cab with the inventive concepts thereof believed set forth in the accompanying claims.

I claim:

1. A vehicle heating system for use with an engine block having a pump whose output is connected to said block for circulating coolant through said block to one output conduit for transmission to a vehicle cabin heater optionally operable for transferring heat from said coolant to the vehicle cabin, the improvement comprising a combustion heater connected in said output conduit for heating coolant transmitted from said conduit to said cabin heater, means operated in response to the operation of said cabin heater and said coolant being below a predetermined temperature for operating said combustion heater, another conduit connected to the output of said pump and bypassing said block for transmitting fluid directly from the output of said pump to said combustion heater without passage through said block, and a thermostatic valve for blocking the flow of coolant through said one output conduit from said block and permitting coolant flow between said other conduit and said combustion heater in response to said coolant being below a selected temperature, said thermostatic valve permitting coolant flow from said one output conduit and blocking coolant flow from said other conduit in response to said coolant reaching said selected temperature.

2. A vehicle heating system for use with an engine block having a pump for circulating coolant through said block to a vehicle cabin heater optionally operable for transferring heat from said coolant to the vehicle cabin, the improvement comprising a combustion heater for supplying heated coolant to said cabin heater, a blower for said combustion heater, a motor for driving said blower, means operated in response to the operation of said cabin heater and said coolant being below a predetermined temperature for operating said combustion heater together with said motor and blower, a gear pump operated by said blower motor for circulating the coolant output of said cabin heater through said combustion heater and cabin heater against the pressure developed by said engine pump, and a check valve interposed between said block and the output of said gear pump for preventing the coolant output of said gear pump from passing to said block.

3. In the vehicle heating system claimed in claim 2 a thermostatically controlled switch for terminating operation of said combustion heater and gear pump in response to said coolant passing said gear pump and reaching a predetermined temperature to thereafter enable the flow of coolant from said block to said cabin heater and prevent the flow of coolant through said gear pump.

4. A vehicle heating system for use with an engine block having a pump for circulating coolant serially through said block to a combustion heater whereafter said coolant is circulated through a vehicle cabin heater and back to said pump with said cabin heater arranged to transfer heat from said coolant to the vehicle cabin on operation of said cabin heater, the improvement comprising a positive displacement pump operated in response to the operation of said combustion heater, conduit means connecting the output of said cabin heater through said positive displacement pump in common with the coolant output from said block to said combustion heater only on operation of said combustion heater to thereby bypass coolant from said block and permit the circulation of coolant between said heaters without passage through said block, means operated only in response to said coolant being below a predetermined temperature and said cabin heater being operated for operating said combustion heater and positive displacement pump to circulate coolant through said bypass conduit means against the pressure developed by said engine pump to prevent the flow of coolant from said block to said combustion heater, and valve means for preventing the flow of coolant from said positive displacement pump to said block against the pressure developed by said engine pump.

5. The system claimed in claim 4 in which said valve means is a check valve operated to block coolant flow from said block to said combustion heater in response to the operation of said combustion heater and the coolant being below a predetermined temperature and operated to permit coolant flow from said block to said combustion heater in response to said coolant reaching said predetermined temperature.

6. The system claimed in claim 4 in which said positive displacement pump is a gear pump and said valve means is a solenoid valve.